Patented Sept. 24, 1935

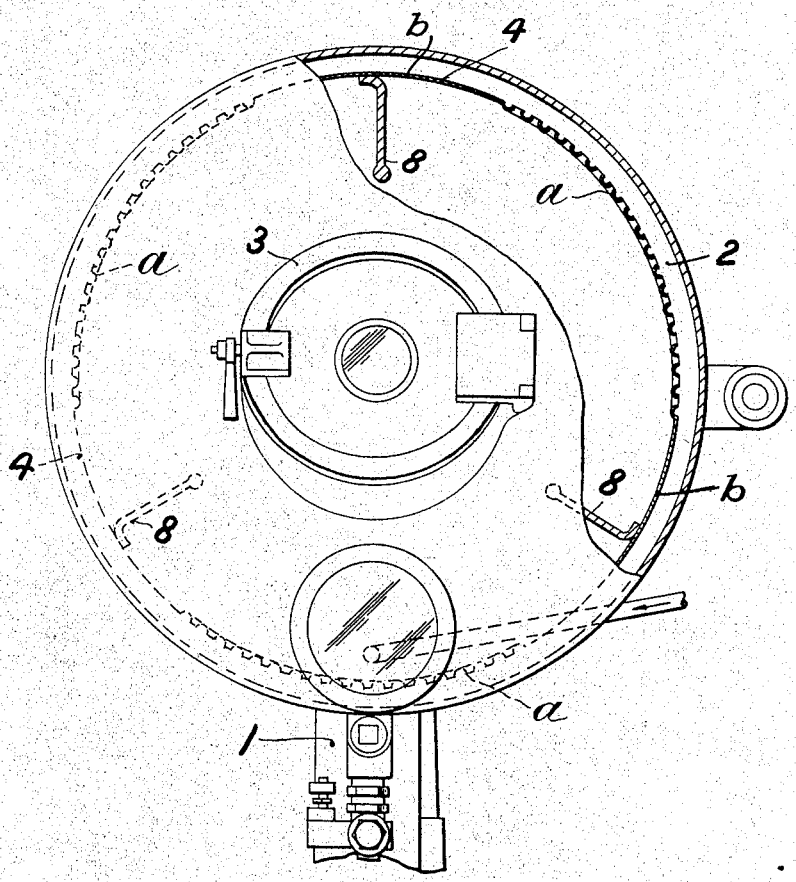

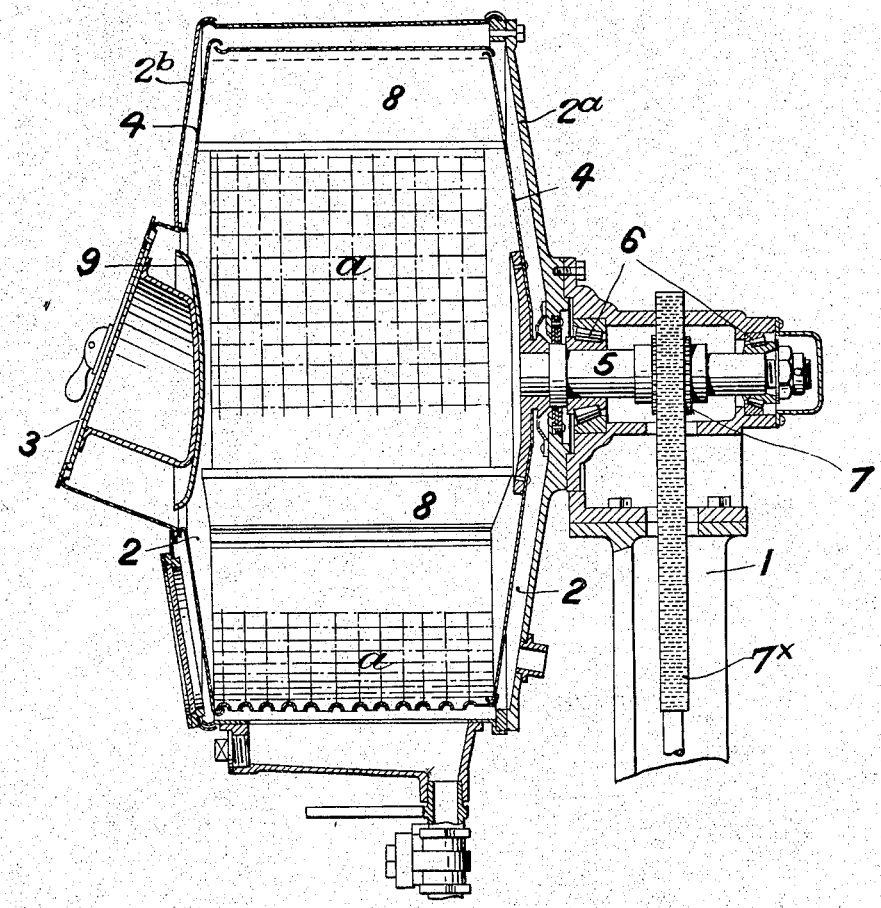

2,015,443

UNITED STATES PATENT OFFICE 2,015,443

DRY CLEANING APPARATUS

Frederick Guy Still, Hatton Garden, London, England, assignor to W. M. Still & Sons, Limited, London, England Application March 30, 1934, Serial No. 718,161
In Great Britain January 18, 1934

1 Claim. (Cl. 68—18)

This invention has reference to dry cleaning apparatus of the kind in which the clothes or other articles are charged into a perforated basket mounted to rotate or oscillate about a horizontal axis within a chamber the lower part of which contains the benzine or other cleansing liquid.

According to this invention the basket which dips into the liquid, is provided with three or other suitable number of radial plates or shelves extending from the circumferential wall some distance towards but terminate short of the axis and the said wall is perforated intermediate of said plates or shelves but is imperforate for a distance on one or both sides of each plate or shelf according to whether the basket is to rotate or oscillate. Usually the plates or shelves, which extend to the end walls of the basket, are flat but they may be curved as viewed in the direction of the axis.

With such a construction some of the liquid is carried up with the clothes by each plate or shelf, the adjacent imperforate portion of the wall preventing escape of liquid until the plate has risen above the horizontal position, the clothes then slipping off into the liquid in the bottom of the basket and liquid carried up by the plate pouring off with and on to them.

The construction of basket described ensures quick and effective washing of the clothes.

The accompanying drawings illustrate a basket according to the invention, Fig. 1 being a front view partly in section, Fig. 2 a vertical section.

1 represents a supporting standard having fixed to it one end cover 2ª of a cleaning chamber 2, the other end cover 2ᵇ of which is formed with a door 3. 4 is the clothes-containing basket which is secured to a driving spindle 5 mounted in roller bearings 6 in the standard 1 and provided with a pinion 7 gearing with a reciprocating toothed rack 7ˣ driven in any suitable way. The cylindrical wall of the basket has spaced perforated zones, indicated at $a$ which are separated by imperforate portions $b$ of the wall. From the middle of each imperforate portion of the wall extends a radial plate or shelf 8 which extends to the imperforate end walls of the basket.

With this construction liquid contained in the lower part of the chamber 2 has free access to and egress from the lower part of the basket 4 through its perforations and during oscillation of the basket, the plates or shelves 8 carry up with the clothes liquid which flows back into the bottom of the basket with and onto the clothes which slide off the plates or shelves when they have risen above a horizontal position and drop into the liquid in the bottom of the basket.

The basket is formed with a charging opening opposite the door 3 and the latter carries a closure 9 which prevents clothes escaping from the basket during its oscillation into the chamber 2.

It has been proposed to provide a washing machine basket, which is rotatable about its horizontal axis in a liquid containing casing with partitions radiating from the axis of the basket and subdividing the interior of the basket into a plurality of segmental compartments, the inner portions only of the partitions being perforated and their outer imperforate portions abutting imperforate portions of the basket wall, which imperforate portions alternate with perforated portions of the said wall. Such an arrangement gives an entirely different washing action to that of the present invention as, though the imperforate portions of the partitions and of the basket wall form liquid receptacles in which the articles being washed and water are lifted, the articles cannot drop from the receptacles so formed but merely slide down the partitions towards the centre of the basket the water escaping through the perforations in the partitions. With a basket according to the present invention the clothes being cleansed drop off the plates or shelves into liquid in the bottom of the basket together with the liquid lifted with them which gives a very effective washing action.

What I claim is:—

Dry cleaning apparatus of the kind comprising a clothes-containing basket mounted to be movable about a horizontal axis within a liquid-containing casing wherein the basket has longitudinally extending perforated zones in its circumferential wall separated by imperforate portions of the wall and has imperforate clothes-lifting plates extending radially inwards from said imperforate portions and terminating short of the axis of the basket, whereby the clothes can slip off the plates into the liquid in the bottom of the basket.

FREDERICK GUY STILL.